(12) United States Patent
Ito

(10) Patent No.: US 6,860,058 B2
(45) Date of Patent: Mar. 1, 2005

(54) FISHING LURE OF SOFT BAIT TYPE

(75) Inventor: Koichi Ito, Shizuoka (JP)

(73) Assignee: Megabass General Baits Inc., Hamamatsu (JP)

(*) Notice: Subject to any disclaimer, the term of this patent is extended or adjusted under 35 U.S.C. 154(b) by 0 days.

(21) Appl. No.: 10/252,368

(22) Filed: Sep. 24, 2002

(65) Prior Publication Data

US 2003/0196368 A1 Oct. 23, 2003

(30) Foreign Application Priority Data

Apr. 18, 2002 (JP) ...................... 2002-116427

(51) Int. Cl.[7] ............................................. A01K 85/00
(52) U.S. Cl. ................... 43/42.28; 43/42.24; 43/42.31; 43/42.35
(58) Field of Search ............................ 43/42.24, 42.28, 43/42.35, 42.06, 42.31, 42.22; D22/126, 127

(56) References Cited

U.S. PATENT DOCUMENTS

| | | | | |
|---|---|---|---|---|
| 3,445,953 A | * | 5/1969 | Dailey | 43/42.28 |
| 3,831,307 A | * | 8/1974 | Pittman | 43/42.31 |
| 3,861,075 A | * | 1/1975 | Ingram | 43/42.35 |
| D239,447 S | * | 4/1976 | Radcliff | D22/127 |
| 4,468,881 A | * | 9/1984 | Gordon, III | 43/42.28 |
| 4,689,914 A | * | 9/1987 | Quinlan | 43/42.22 |
| 4,744,168 A | * | 5/1988 | McClellan | 43/42.24 |
| 4,751,789 A | * | 6/1988 | Devereaux et al. | 43/42.28 |
| D300,053 S | * | 2/1989 | Mann | D22/127 |
| 4,890,412 A | * | 1/1990 | Tsao et al. | 43/42.24 |
| 5,042,189 A | * | 8/1991 | Bailey | 43/42.22 |
| 5,119,581 A | * | 6/1992 | Rudolph | 43/42.28 |
| 5,121,567 A | * | 6/1992 | Boone | 43/42.24 |
| 5,193,299 A | * | 3/1993 | Correll et al. | 43/42.24 |
| 5,438,790 A | * | 8/1995 | Rigney | 43/42.24 |
| 5,465,523 A | * | 11/1995 | Garst | 43/42.24 |
| 5,894,692 A | * | 4/1999 | Firmin | 43/42.28 |
| 5,926,995 A | * | 7/1999 | Dubois | 43/42.31 |
| 5,943,811 A | * | 8/1999 | Packer | 43/42.24 |
| 5,996,271 A | * | 12/1999 | Packer | 43/42.24 |
| 6,073,383 A | * | 6/2000 | Line | 43/42.24 |
| 6,138,399 A | * | 10/2000 | Wilson | 43/42.28 |
| 6,145,239 A | * | 11/2000 | Hirahara et al. | 43/42.34 |
| 6,154,999 A | * | 12/2000 | Woods | 43/42.28 |
| 6,192,618 B1 | * | 2/2001 | Wackerman | 43/42.31 |
| D438,590 S | * | 3/2001 | Saverino | D22/127 |
| 6,393,755 B1 | * | 5/2002 | Weaver | 43/42.06 |
| 2003/0046858 A1 | * | 3/2003 | Meraw | 43/42.28 |

FOREIGN PATENT DOCUMENTS

| | | | |
|---|---|---|---|
| JP | 10-225247 B1 | * | 8/1998 |
| JP | 10-313734 B1 | * | 12/1998 |
| JP | 10-323144 B1 | * | 12/1998 |
| WO | WO-98/08378 B1 | * | 3/1998 |

* cited by examiner

Primary Examiner—Darren W. Ark
(74) Attorney, Agent, or Firm—Arent Fox, PLLC

(57) ABSTRACT

A body and a tail which is curled and is integrally formed in a thin wall shape at a rear end of the body are provided, and a spherical body is integrally formed at a tip of the tail. When the tail extends and swings in the water, an efficient lure action can be produced according to a balance to other parts. Additionally, water flow resistance increases according to volume of the spherical body to produce vibration efficiently, and therefore, it is possible to easily obtain a lure action which is complex and has a high fish-luring effect.

14 Claims, 4 Drawing Sheets

F I G. 6
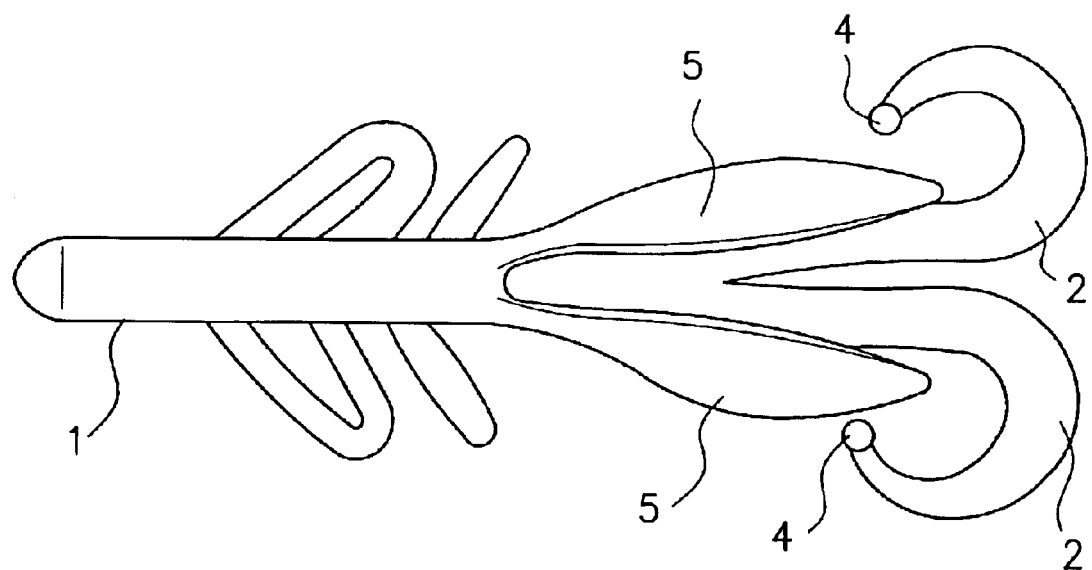

FISHING LURE OF SOFT BAIT TYPE

CROSS-REFERENCE TO RELATED APPLICATIONS

This application is based upon and claims priority of Japanese Patent Application No. 2002-116427, filed on Apr. 18, 2002, the contents being incorporated herein by reference.

BACKGROUND OF THE INVENTION

1. Field of the Invention

The present invention relates to a fishing lure which is referred to as a soft bait.

2. Description of the Related Art

As a type of a fishing lure (artificial bait), there is a fishing lure which is referred to as a soft bait. The soft bait is made of soft resin, and various shapes, patterns and colors thereof are known. The greatest characteristic of the soft bait is its soft elasticity, which enables various performances, such as a drift and a mincing movement in the water like a living bait.

By setting the soft bait like the above to fishing tackle, and by retrieving it and making it act, the drift and the mincing movement in the water as described above are made possible. It is desired to easily obtain a lure action which is complex and has a high fish-luring effect.

SUMMARY OF THE INVENTION

The present invention is made in view of the above circumstances, and its object is to provide a fishing lure of a soft bait type which can easily obtain a lure action which is complex and has a high fish-luring effect.

The fishing lure of the present invention is a fishing lure of a soft bait type, which is made of resin. It includes a body and a tail being integrally formed in a thin wall shape at a rear end of the body, and is characterized in that a swelling part is provided to the tail.

BRIEF DESCRIPTION OF THE DRAWINGS

FIG. 6 is a view showing another example of the soft bait;

DETAILED DESCRIPTION OF THE PREFERRED EMBODIMENTS

Hereinafter, preferred embodiments of a fishing lure according to the present invention will be explained with reference to the drawings.

Figure 1:
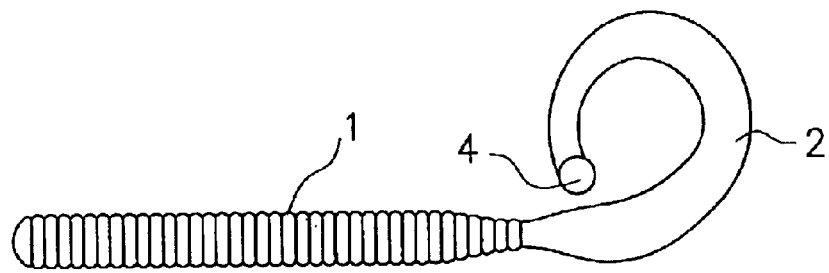
FIG. 1 is a side view showing a soft bait of this embodiment.
Figure 2:
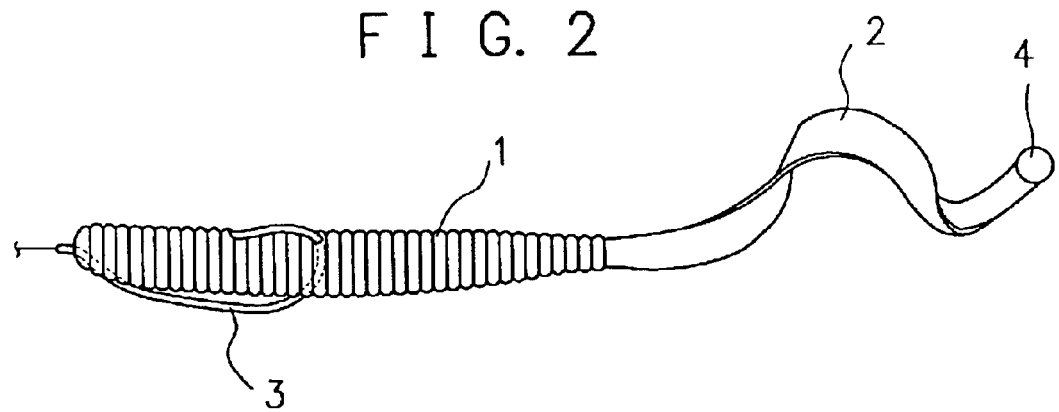
FIG. 2 is a view showing how the soft bait of this embodiment is used.

FIG. 1 and FIG. 2 are views showing a soft bait according to this embodiment, which is made of soft synthetic resin. What is called a curly tail, which is a type of the soft bait having a slim body 1 and a tail 2 which is curled and is integrally formed in a thin wall shape at a rear end of the body 1, is shown in the drawings. Patterns and colors are properly added to the body 1 and the tail 2 so that they stand out in the water.

When this kind of the soft bait is set to a hook 3 as shown in FIG. 2 to swim in the water, the tail 2 extends and swings to attract attention of a fish.

It should be mentioned that, according to the soft bait of this embodiment, a spherical body 4 is integrally formed at a tip of the tail 2. The spherical body 4 can be, for example, colored to improve its visual effect or, on the contrary, it can be left transparent.

According to this kind of the soft bait, the spherical body 4 which is at the tip of the tail 2 functions as a strike dot at which a fish eater such as a bass aims, so that a fish-luring effect is exhibited.

When it is allowed to swim in the water, the tail 2 extends and swings, whereby an efficient lure action can be produced according to a size and a weight balance of the spherical body 4.

Even if, for example, the spherical body 4 is made of soft synthetic resin, similarly to the body 1 and the tail 2, and is integrally formed, it is possible to change a specific gravity of the spherical body 4 to be different from other parts by molding it by two-color injection molding. When the specific gravity of the spherical body 4 is made to be higher than that of the other parts, the spherical body 4 acts as a weight which can vibrate the tail 2 largely or, on the contrary, suppress the large vibration of the tail 2 and produce mincing vibration according to the balance. Alternatively, when the specific gravity of the spherical body 4 is made to be lower than that of the other parts, the spherical body 4 exhibits buoyancy to change the vibration of the tail 2, and the efficient lure action can be obtained as well.

Additionally, since water flow resistance increases according to volume of the spherical body 4, it is made possible to produce the vibration efficiently.

Incidentally, the spherical body 4 may have a shape swelling in a hemispherical shape toward each surface side of the tail 2, or it may have a shape swelling in a spherical shape toward either one surface side of the tail 2. For example, when it has the shape swelling in the spherical shape toward either one surface side of the tail 2, it is possible to cause a difference between the swing of the tail to the left and to the right, and to produce complex movements.

Figure 3:
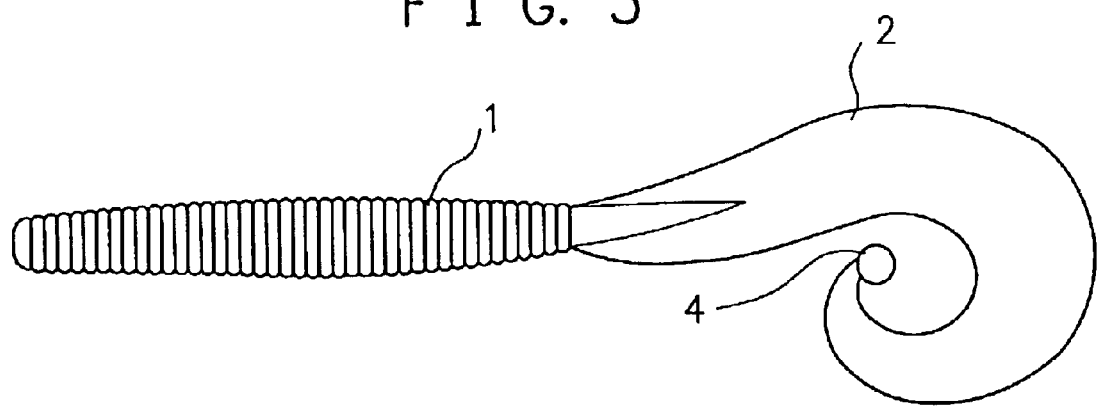
FIG. 3 is a view showing another example of the soft bait.

Hereinafter, examples of variations of the soft bait will be shown with reference to FIG. 3 to FIG. 6. Incidentally, the same numerals are given to designate the same structural components as those of the above-described embodiment. FIG. 3 shows what is called a grab, which is a type of the soft bait having a slim body 1 and a tail 2 which is curled and is integrally formed in a thin wall shape at a rear end of the body 1, in which the tail 2 is especially large. A spherical body 4 is integrally formed at a tip of the tail 2, similarly to the above-described embodiment.

Figure 4:
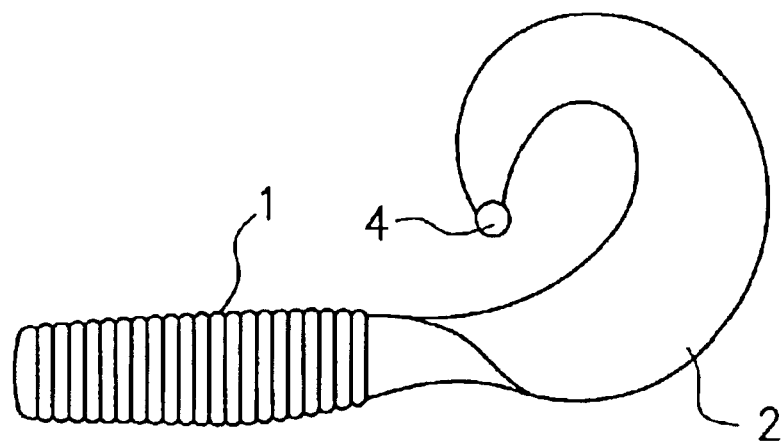
FIG. 4 is a view showing another example of the soft bait.
Figure 5:
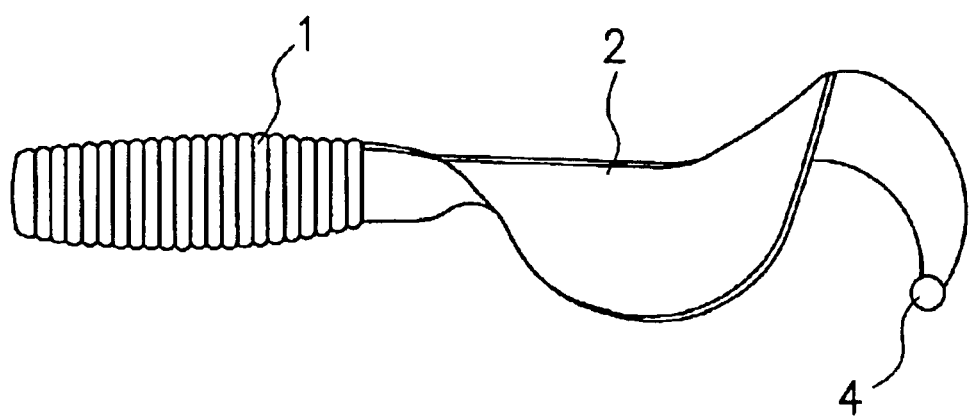
FIG. 5 is a view showing the soft bait of FIG. 4 with a modified tail 2.

FIG. 4 and FIG. 5 similarly show the type of the soft bait referred to as the grab, with relatively short length of a body 1. A spherical body 4 is integrally formed at a tip of the tail 2, similarly to the above-described embodiment.

FIG. 6 shows a soft bait having a plurality of tails at a rear end of a body 1. In this example, it includes a tail 2 which is curled and is integrally formed in a thin wall shape at the rear end of the body 1 and a tail 5 which is arranged outside the tail 2 in a substantial leaf shape. Spherical bodies 4 are integrally formed at tips of the curled tail 2. Incidentally, when there are a plurality of the tails, the spherical bodies 4 may be provided to all of the tails, or may be provided to only a part of the tails.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

For example, in the above-described embodiments, the example of integrally forming the spherical body 4 to the tail is explained. However, the material and the member of the spherical body 4 may be different.

Figure 7:
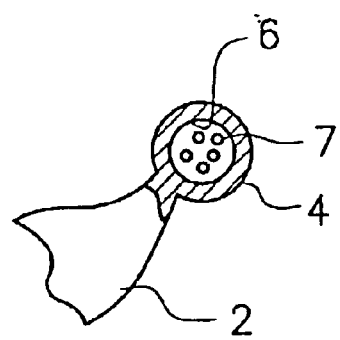
FIG. 7 is a view showing a cross section of a spherical body 4.

It is possible to form a hollow part in the spherical body 4 to store a member as a weight and a member as a buoyancy body therein, or to leave it hollow. Alternatively, as shown in FIG. 7, it is also possible to store small members 7 such as minute spheres called as rattles in a hollow part 6, so as to make noise by vibration.

Incidentally, in the above-described embodiments, the spherical body 4 is explained as a swelling part according to the present invention. However, its shape is not restrictive, and various shapes such as an ellipse body, a polygon body (polyhedral body), and a cylindrical body are suitable.

Moreover, the position of the spherical body 4 is not limited to the tip of the tail 2, but the spherical body 4 may be arranged at a desired point of the tail. The number of the spherical body 4 is not necessarily one for one tail, but a plurality of the spherical bodies 4 may be provided thereto.

Figure 8:
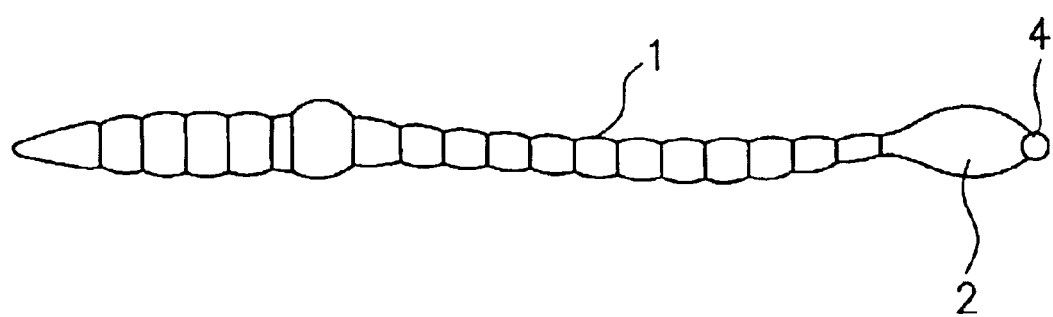
FIG. 8 is a view showing another example of the soft bait.

Furthermore, in the above-described embodiments, the example of the tail of a curl type is shown, but the present invention may be applied to a tail of a straight type, as shown in FIG. 8.

As explained thus far, the swelling part such as the spherical body, which functions as the strike dot at which the fish eater such as the bass aims, is provided to the tail in the thin wall shape, so that the fish-luring effect is exhibited. When it is allowed to swim in the water, the tail extends and swings. At this time, the swelling part acts as the weight, whereby the efficient lure action can be produced according to the balance to other parts. Since the water flow resistance increases according to the volume of the swelling part to produce the vibration efficiently, it is possible to easily obtain the lure action which is complex and has the high fish-luring effect.

What is claimed is:

1. A fishing lure of a soft bait type, which is made of resin, comprising:

a body made of a soft synthetic resin; and a tail made of a soft synthetic resin and being integrally molded with said body in a thin flat shape at a rear end of said body, wherein a swelling part is provided on said tail spaced from the body;

wherein said swelling part is molded integrally with said tail and wherein said swelling part is made of a soft synthetic resin in the form of a spherical body.

2. The fishing lure according to claim 1, wherein said swelling part is provided at a tip of said tail.

3. The fishing lure according to claim 1, wherein a specific gravity of said swelling part is made to be higher than that of the body and the tail.

4. The fishing lure according to claim 3, wherein said swelling part is formed integrally to said tail by two-color injection molding.

5. The fishing lure according to claim 1, wherein a specific gravity of said swelling part is made to be lower than that of the body and the tail.

6. The fishing lure according to claim 5, wherein said swelling part is formed integrally to said tail by two-color injection molding.

7. The fishing lure according to claim 1, wherein said tail is a curl type tail.

8. The fishing lure according to claim 1, wherein said tail is a straight type tail.

9. The fishing lure according to claim 1, wherein a hollow part is formed inside said swelling part.

10. The fishing lure according to claim 9, wherein a member comprising a weight is stored in the hollow part.

11. The fishing lure according to claim 9, wherein a member comprising a buoyancy body is stored in the hollow part.

12. The fishing lure according to claim 9, wherein small members are stored in the hollow part so as to make noise by vibration.

13. The fishing lure according to claim 1, wherein a plurality of said tails are integrally formed at the rear end of said body, and said swelling parts are provided on all or some of the tails.

14. A fishing lure of a soft bait type, which is made of resin, comprising:

a body made of a soft resin; and a tail made of said soft resin and being integrally molded with said body in a thin flat shape at a rear end of said body, wherein a swelling part is provided on said tail spaced from the body;

wherein said swelling part is molded integrally with said tail and wherein said swelling part is made of a soft resin in the form of a spherical body with a specific gravity different from other parts of the fishing lure.

* * * * *